United States Patent
Hanoun

(10) Patent No.: US 8,069,737 B2
(45) Date of Patent: Dec. 6, 2011

(54) FORCE SENSING SYSTEM FOR A TENSIONED FLEXIBLE MEMBER

(75) Inventor: Reed Hanoun, Mississauga (CA)

(73) Assignee: MYTRAK Health System, Inc., Ontario (CA)

( * ) Notice: Subject to any disclaimer, the term of this patent is extended or adjusted under 35 U.S.C. 154(b) by 218 days.

(21) Appl. No.: 12/167,654

(22) Filed: Jul. 3, 2008

(65) Prior Publication Data

US 2009/0013804 A1    Jan. 15, 2009

Related U.S. Application Data

(60) Provisional application No. 60/948,724, filed on Jul. 10, 2007.

(51) Int. Cl.
*G01L 1/22* (2006.01)

(52) U.S. Cl. .................................. 73/862.474

(58) Field of Classification Search .............. 73/862.474
See application file for complete search history.

(56) References Cited

U.S. PATENT DOCUMENTS

| | | | | | |
|---|---|---|---|---|---|
| 4,290,598 | A | * | 9/1981 | Flannery | 482/94 |
| 4,478,595 | A | * | 10/1984 | Hayakawa et al. | 474/109 |
| 4,709,130 | A | * | 11/1987 | Lodetti et al. | 219/69.12 |
| 4,827,805 | A | * | 5/1989 | Moan | 477/41 |
| 5,728,953 | A | * | 3/1998 | Beus et al. | 73/862.472 |
| 6,901,818 | B1 | * | 6/2005 | Cheung | 73/862.393 |
| 7,083,554 | B1 | * | 8/2006 | Lo Presti | 482/137 |
| 2007/0126837 | A1 | * | 6/2007 | Takahashi et al. | 347/104 |

* cited by examiner

*Primary Examiner* — Lisa Caputo
*Assistant Examiner* — Octavia Davis
(74) *Attorney, Agent, or Firm* — Damon Morey LLP; David L. Principe

(57) ABSTRACT

A force sensing system comprising a force sensor cell with the necessary electronics to acquire and process various signals. The signals may provide force measurement data for activities performed, for instance, on a weight stack exercise machine.

11 Claims, 5 Drawing Sheets

FORCE SENSING SYSTEM FOR A TENSIONED FLEXIBLE MEMBER

CROSS-REFERENCE TO RELATED APPLICATION

This application claims the benefit of U.S. Provisional Patent Application No. 60/948,724 entitled "Force Sensing System for Exercise Equipment", which was filed Jul. 10, 2007.

BACKGROUND

A force sensing system is a system comprising one or more load sensors with the necessary electronics to acquire and process various signals. The signals may provide force measurement data for activities performed.

BRIEF DESCRIPTION OF THE DRAWINGS

Embodiments are illustrated by way of example and not limitation in the figures of the accompanying drawings, in which like reference numerals indicate corresponding, analogous or similar elements, and in which.

DETAILED DESCRIPTION

The force sensing system is described here in an exemplary context of being coupled to a weight stack exercise machine, although other weight lifting applications, commercial or industrial, are also contemplated. A weight stack exercise machine comprises one or more lifting arms that are moved by the person exercising on the exercise equipment. The lifting arm(s) are coupled to the weight plates of the weight stack by a weight lifting member that may be a flexible member such a belt or cable. The amount of weight lifted by a user during exercise is determined by the number of weight plates selected from the weight stack.

The rest of this description is based on an embodiment in which the flexible member is a belt. However, it will be obvious to a person of ordinary skill in the art how to modify the described embodiment to apply a different weight lifting member, for example, one involving a cable or a band. The belt is attached to the weight stack to lift the weights and to translate the load to one or more of the lifting arms. The weight lifting member used in commercially available weight stack machines may comprise the use of one or more cables, belts, or bands, or a combination thereof. A variety of materials, including composite materials, for the cable, belt and/or band are also contemplated.

Figure 1:
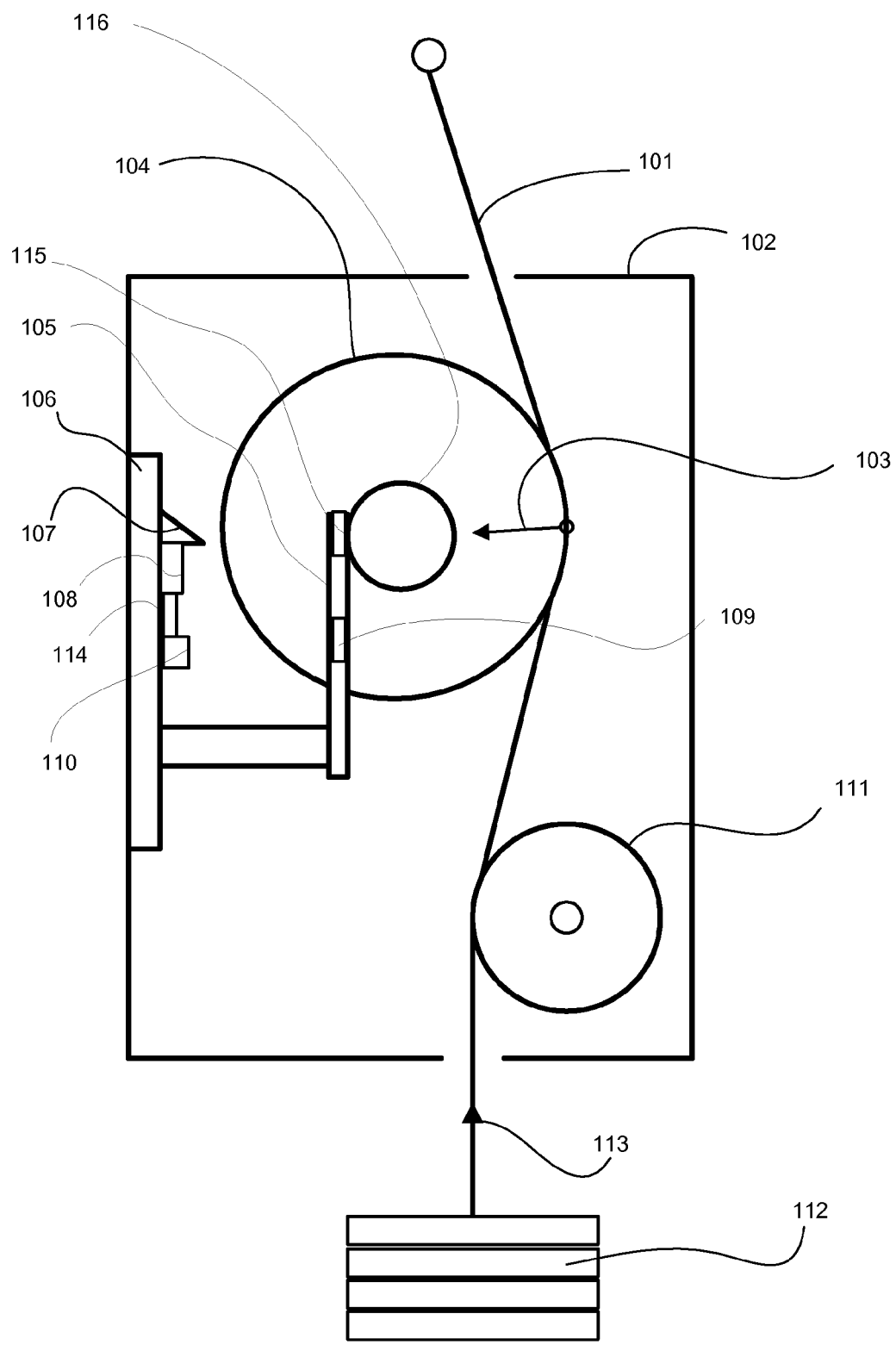
FIG. 1 is a conceptual diagram of an exemplary force sensing system for a tensioned flexible member.

FIG. 1 is a conceptual diagram of an exemplary force sensing system for a tensioned flexible member. As the weight plates of weight stack 112 is being lifted by a person exercising on the exercise equipment, belt 101 connecting the lifting arms of the exercise equipment to weight stack 112 begins to experience a tension load 113. The greater the weight of weight stack 112 being lifted the greater the tension load 113 on belt 101. As the weight is lifted, belt 101 moves in translation and changes its position accordingly. Belt 101 runs directly through force sensing module enclosure 102 following a specific travel path, wrapped around and engaged at load pulley 104. A pre-tensioning pulley 111 may be employed between the weight stack 112 and load pulley 104 in order to dampen the effects of any sudden perturbations experienced during lifting of weight stack 112. Pre-tensioning pulley 111 may be adapted to conform to the shape of belt 101 to securely engage and contain belt 101 while belt 101 moves.

As the weight stack exercise machine is being used, directing belt 101 to travel through and partially wrap around load pulley 104 forces belt 101 to transfer its static tension load 113 directly to load pulley 104, whereby load pulley 104 experiences direct radial force 103. Load pulley 104 is able to rotate substantially freely about its fixed axis 116 that is anchored, either directly or indirectly, within force sensing module enclosure 102. As belt 101 moves, load pulley 104 upon which it is engaged rotates correspondingly.

Radial force 103 exerted on load pulley 104 stresses the fixed axis 116 of load pulley 104, causing a physical strain thereupon. Force sensor cell 105 is in contact with the fixed axis 116 of load pulley 104 and is configured to sense a change in physical strain thereupon via strain sensor 115. Strain sensor 115 may be a commercially available strain gauge arrangement comprising one or more strain gauges. Force sensor cell 105 is further electrically configured to generate a change in output voltage proportional to the change in physical strain that the strain sensor 115 experiences. Force sensor cell 105 further includes amplifier circuit 109 for amplifying and conditioning the output voltage from strain sensor 115 for further processing via analog to digital converter 114. Amplifier circuit 109 may have programmable amplifier gain to enhance its versatility in handling a wide range of tension loads 113 from weight stack 112.

Other types of force sensors instead of a strain gauge arrangement, such as optical strain sensors, are contemplated and may alternatively be deployed in force sensor cell 105.

Printed circuit board 106 is electrically connected to force sensor cell 106, and includes electrical circuitry and components for processing output voltage signals therefrom. Analog to digital converter 114 converts the amplified output voltage signal from amplifier circuit 109 into a digital output voltage signal for processing at processor 108. Analog to digital converter 114 may alternatively be located within force sensor cell 105 instead of on printed circuit board 106. Memory 110 is coupled to processor 108 and stores a predetermined correlation between the output voltage signal of force sensor cell 105 and tension load 113, the correlation having been determined as the result of a calibration process. Memory 110 also stores selected results of computations performed by processor 108.

Optionally, a position sensing system may be incorporated into the force sensing module enclosure 102. The position sensing system may comprise an encoder, potentiometer or other position sensing components in communication with load pulley 104. Exemplary optical encoder 107 is in optical communication with load pulley 104 and senses rotation of load pulley 104 as belt 101 moves during lifting and lowering activity. Optical encoder 107 transmits load pulley 104 rotation information to processor 108 which in turn computes the corresponding linear distance travelled by belt 101. The distance travelled by belt 101 which is computed by processor 108 may be stored in memory 110.

Although printed circuit board 106 is depicted at a specific location within force sensing module enclosure 102, it may alternatively be located elsewhere while being electrically accessible thereto. Furthermore, all separate components including processor 108, amplifier circuit 109, analog to digital converter 114 and memory 110, or any combination thereof, may be incorporated into a single integrated circuit device to be deployed for use with force sensor cell 105.

Figure 2:
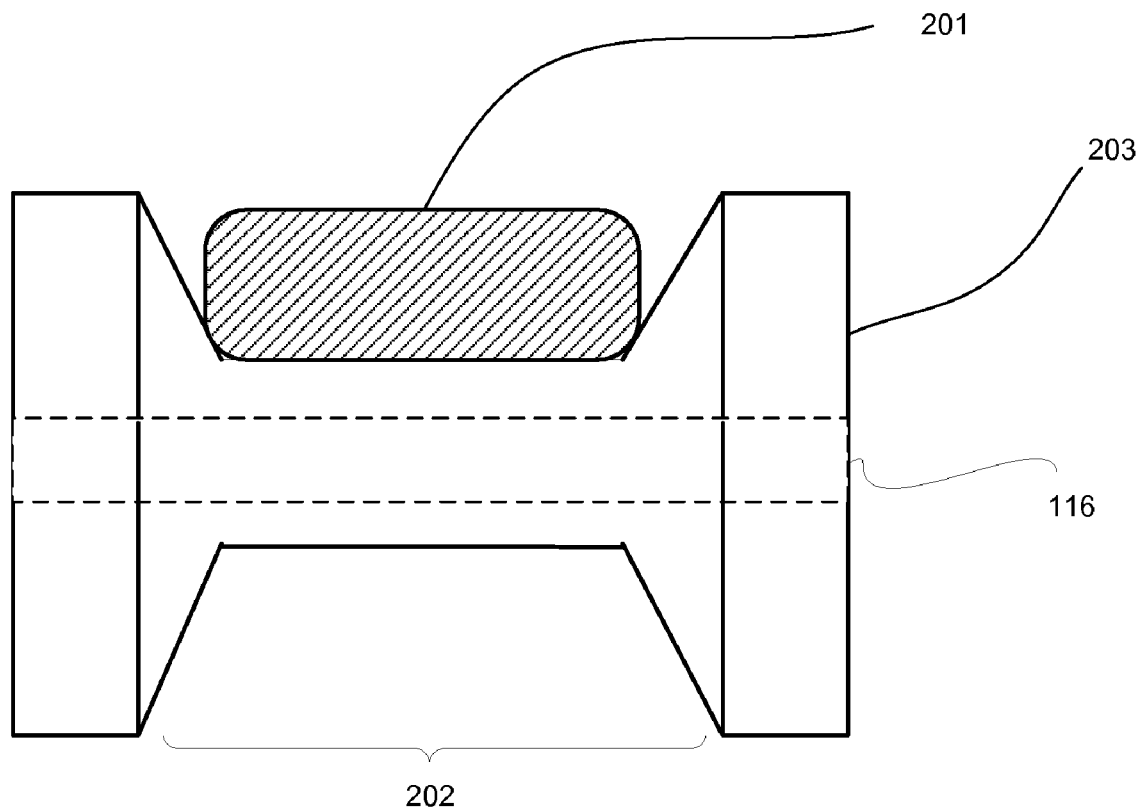
FIG. 2 is a cross-sectional illustration of a portion of the force sensing system adapted for a belt type of flexible member.

FIG. 2 is a cross-sectional illustration of a portion of the force sensing system, at load pulley 104, adapted for a belt type of flexible member. Belt channel 202 is designed to geometrically conform to the shape of belt 201 in order to securely retain belt 201 within load pulley 104.

Figure 3:
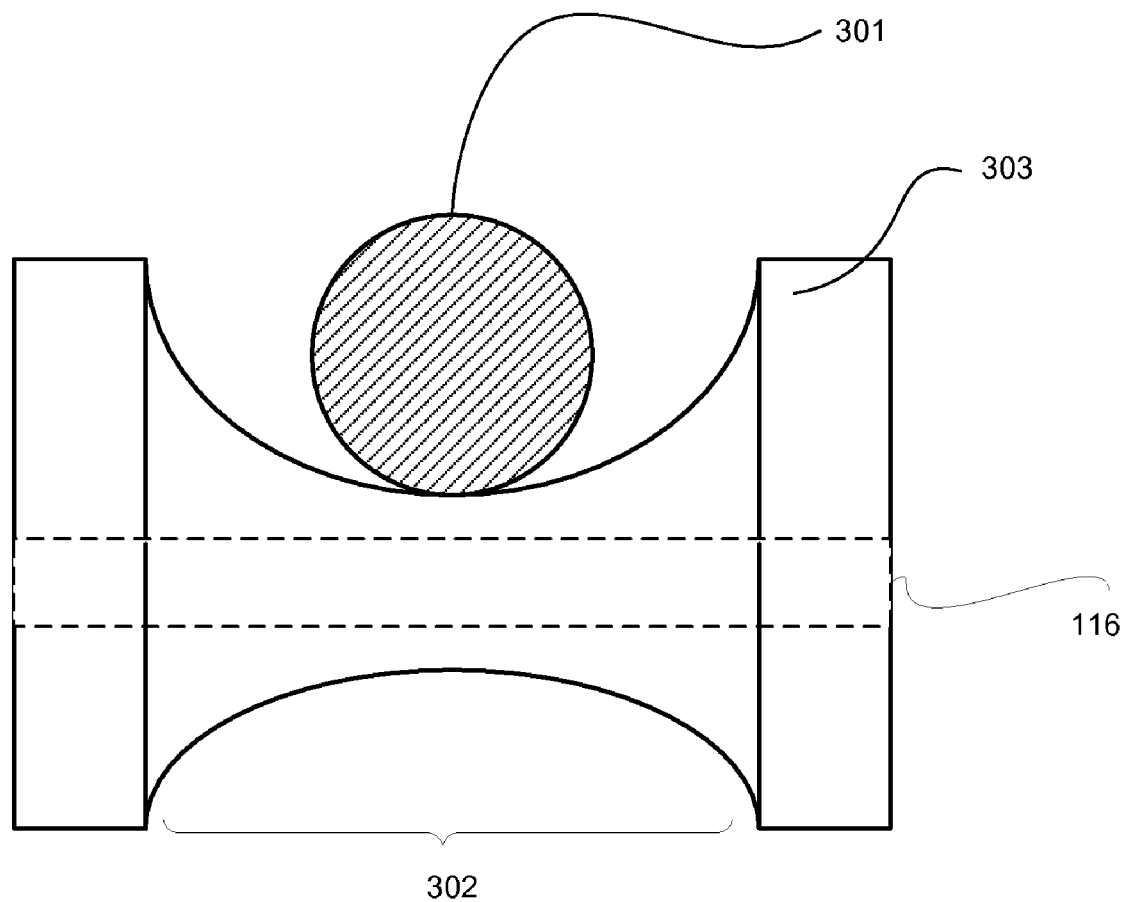
FIG. 3 is a cross-sectional illustration of a portion of the force sensing system adapted for a cable type of flexible member.

FIG. 3 is a cross-sectional illustration of a portion of the force sensing system, at load pulley 104, adapted for a cable type of flexible member. Cable channel 302 is designed to geometrically conform to the shape of cable 301 in order to securely retain cable 301 within load pulley 104.

Figure 4:
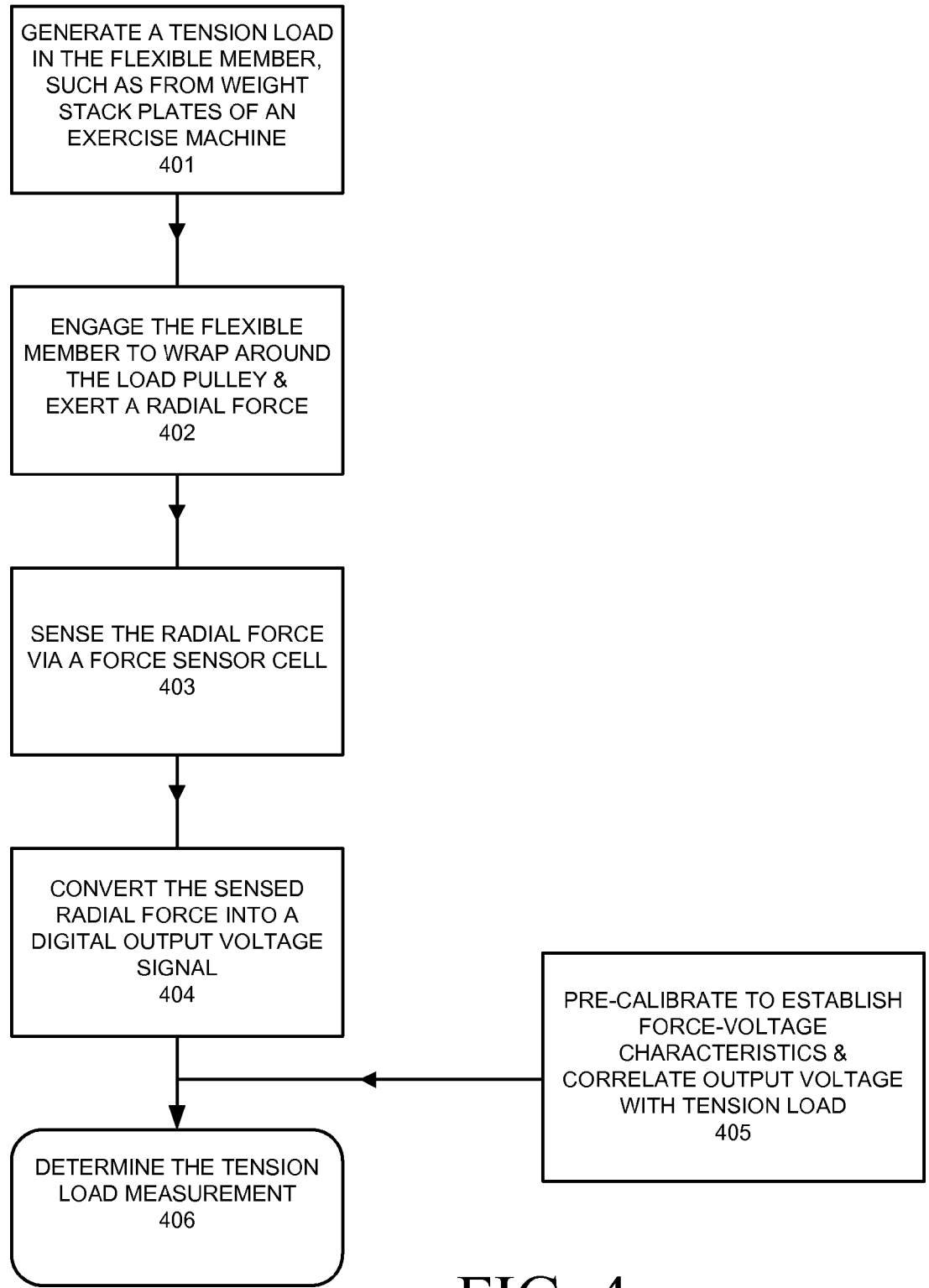
FIG. 4 is a flowchart illustrating an exemplary method for sensing and measuring a tension load generated in the flexible member of the force sensing system.

FIG. 4 is a flowchart illustrating the exemplary method for sensing and measuring a tension load generated in the flexible member of the force sensing system. At 401, a tension load 113 is generated in belt 101 when the selected weight plates of weight stack 112 are lifted by a user of the exercise machine. At 402, a corresponding radial force exerted at load pulley 104 by belt 101 stresses the fixed axis of load pulley 104 to cause a physical strain thereon. At 403, force sensor cell 105 senses the physical strain at the axis of load pulley, and generates an amplified output voltage signal which is proportional thereto, having been amplified by amplifier circuit 109. At 404, analog to digital converter 114 converts the amplified voltage signal to a digital output voltage signal suitable for processing by processor 108.

At 405, the force sensing system is calibrated to establish and predetermine a correlation between tension load 113 and output voltage signal of force sensor cell 105. The correlation between correlation between tension load 113 and output voltage signal of force sensor cell 105 may be of a linear form $F=Av+B$, where F is the tension load equal to the weight stack being lifted, A and B are numerical constants, and v is the output voltage of force sensor cell 105. The correlation between tension load 113 and output voltage signal of force sensor cell 105 is not limited to a linear form, and may comprise alternate forms, such as a polynomial form. By observing the output voltages corresponding to at least two predetermined weights, numerical constants A and B are determined. More than two predetermined weights may be used for the calibration. For instance, one weight at the lower end of the range of weights in weight stack 112, another weight at the upper end of the range of weights, and then other intermediate weights within the upper and lower end of the range of weights for the weight stack exercise machine. For each weight used in the calibration, the corresponding output voltage is recorded. Processor 108 may then be used to compute numerical constants A and B based on the formula $F=Av+B$. Numerical constants A and B are stored in memory 110 along with the formulaic relationship $F=Av+B$ for correlating tension load F with output voltage v.

At 406, the value of tension load 113 caused by the selected weight plates of weight stack 112 is calculated based on the output voltage of force sensor cell 105, based on the formula $F=Av+B$, numerical constants A and B having been predetermined and stored in memory 110.

Figure 5:
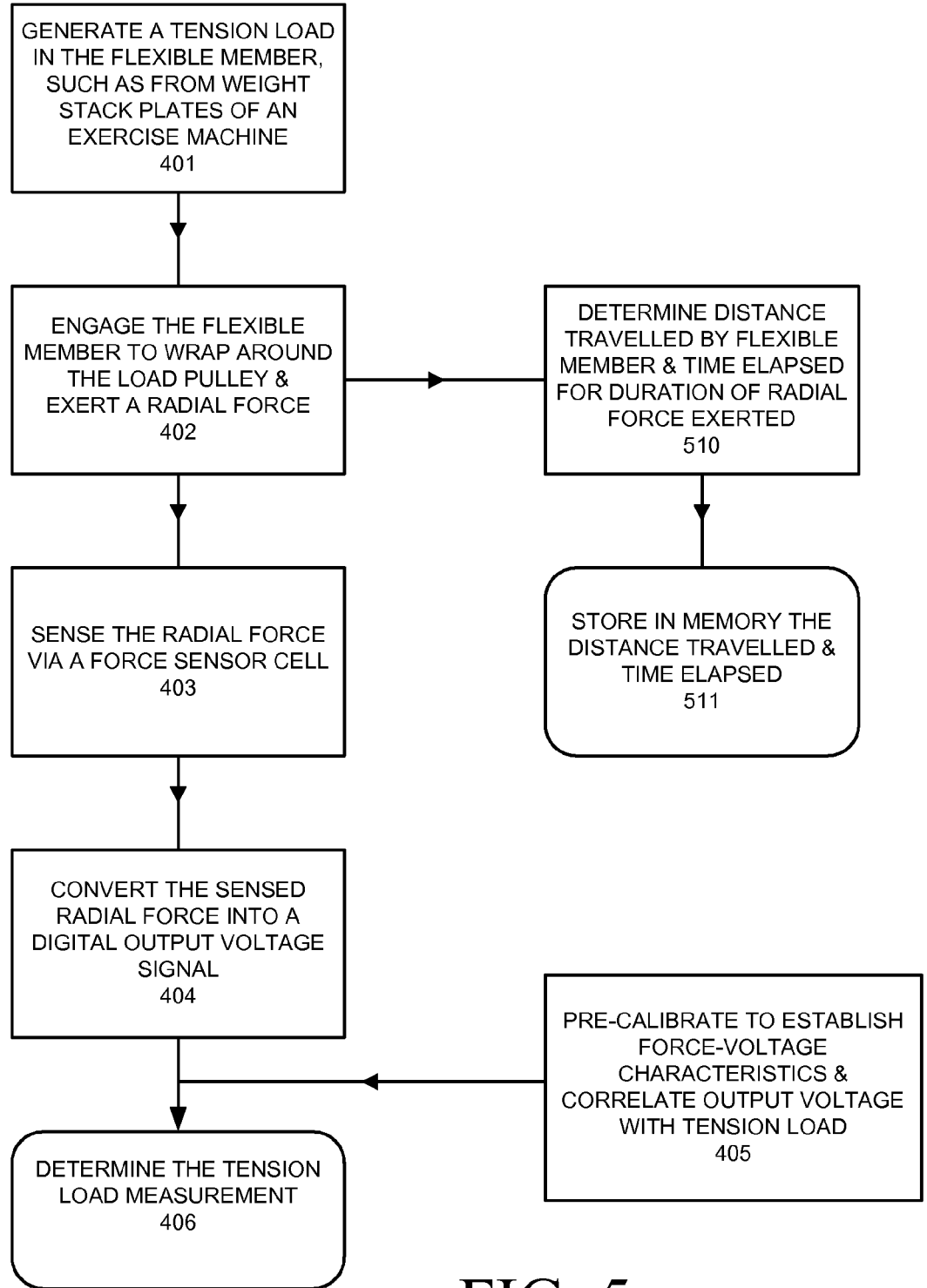
FIG. 5 is a flowchart further illustrating the exemplary method for sensing and measuring a tension load generated in the flexible member of the force sensing system that further incorporates measuring and storing the distance travelled and time elapsed.

FIG. 5 is a flowchart further illustrating the exemplary method for sensing and measuring a tension load generated in the flexible member of the force sensing system that further incorporates measuring and storing the distance travelled and time elapsed. At 510, the rotation of load pulley 104 is sensed by optical encoder 107, which transfers the rotation information to processor 108 for calculating the corresponding linear distance travelled by belt 101. The time elapsed during the rotation of load pulley 104 may also be measured by processor 108, and communicated to memory 110. At 411, the distance travelled and the time elapsed are stored in memory 110.

The force measurement data and/or position measurement data may be used to determine the amount of range of motion performed by the person exercising on the exercise machine in real time. The measurements, range of motion, and/or information gleaned from processing the measurements may be sent from memory 110 to a display or reporting system. Possible forms of display and reporting may include visual display, audio or other user output. For example, a numeric display viewable by the user may indicate the precise weight being lifted. Lights of different colors (e.g. red, yellow and green) in a display viewable by the user may indicate the actual range of motion relative to a possible range of motion, and may indicate whether the load being lifted is at, below or above a prescribed weight.

Although the subject matter has been described in language specific to structural features and/or methodological acts, it is to be understood that the subject matter defined in the appended claims is not necessarily limited to the specific features or acts described above. Rather, the specific features and acts described above are disclosed as exemplary forms of implementing the claims.

What is claimed is:

1. A force sensing system for measuring a tension load applied to a flexible member, comprising: a load pulley rotatable on a fixed axis, the load pulley arranged to movably engage the flexible member such that the flexible member partially wraps around the load pulley in order to exert a radial force thereupon; a force sensor cell in communication with the fixed axis of the load pulley to sense a physical strain caused by the exerted radial force upon the load pulley and generate an output voltage signal proportional to the physical strain; an analog to digital converter coupled to the force sensor cell to convert the output voltage signal from the force sensor cell into a digital output voltage signal; a memory arranged to store a predetermined correlation between the output voltage signal and the tension load; and a processor coupled to the memory and to the analog to digital converter, the processor arranged to determine the tension load from the digital output voltage signal according to the predetermined correlation.

2. The force sensing system of claim 1, further comprising a position sensing system to sense distance traveled by the flexible member for the duration of application of the radial force upon the load pulley.

3. The position sensing system of claim 2, wherein the position sensing system further comprising an optical encoder, the optical encoder arranged in optical communication with the load pulley.

4. The force sensing system of claim 1, wherein the memory is arranged to store time elapsed for the duration of application of the radial force upon the load pulley by the flexible member.

5. The force sensing system of claim 1, wherein the flexible member comprises a belt.

6. The force sensing system of claim 1, wherein the flexible member comprises a cable.

7. The force sensing system of claim 1, wherein the force sensor cell comprises: a strain gauge arrangement to sense the physical strain exerted by the radial force upon the load pulley; and an amplifier circuit to amplify the output voltage from the strain gauge arrangement.

8. The force sensing system of claim 1, wherein the load pulley is adapted to securely engage the flexible member within a channel formed in the load pulley.

9. The force sensing system of claim 1, further comprising a pre-tensioning pulley disposed between the load pulley and the tension load, the pre-tensioning pulley further arranged to movably engage the flexible member.

10. The force sensing system of claim 1, wherein the tension load is generated by at least one weight plate selected from a stack of weight plates on an exercise machine.

11. A module for measuring a tension load applied to a flexible member in an exercise machine, comprising: a load pulley rotatable on a fixed axis, the load pulley arranged to movably engage the flexible member such that the flexible member partially wraps around the load pulley in order to exert a radial force thereupon; a force sensor cell in communication with the fixed axis of the load pulley to sense a physical strain caused by the exerted radial force upon the load pulley and generate an output voltage signal proportional to the physical strain; an analog to digital converter coupled to the force sensor cell to convert the output voltage signal from the force sensor cell into a digital output voltage signal; a memory arranged to store a predetermined correlation between the output voltage signal and the tension load; and a processor coupled to the memory and to the analog to digital converter, the processor arranged to determine the tension load from the digital output voltage signal according to the predetermined correlation.

* * * * *